United States Patent [19]

Follett

[11] Patent Number: 4,568,982
[45] Date of Patent: Feb. 4, 1986

[54] OPTICAL SCANNING METHOD AND APPARATUS

[75] Inventor: David R. Follett, Succasunna, N.J.

[73] Assignee: AT&T Laboratories, Murray Hill, N.J.

[21] Appl. No.: 598,530

[22] Filed: Apr. 9, 1984

[51] Int. Cl.⁴ .......................... H04N 1/29; H04N 3/08
[52] U.S. Cl. ................................. 358/206; 346/76 L; 346/160; 350/6.9; 350/486; 358/208; 358/300
[58] Field of Search ............... 358/199, 206, 208, 285, 358/296, 300, 302; 346/76 L, 160; 350/486, 99, 6.1, 6.5, 6.9

[56] References Cited

U.S. PATENT DOCUMENTS

| | | | |
|---|---|---|---|
| 3,561,846 | 2/1971 | Kingsland | 358/294 |
| 3,835,249 | 9/1974 | Dattilo et al. | 358/295 |
| 3,898,627 | 8/1975 | Hooker et al. | 364/900 |
| 3,922,059 | 11/1975 | Noguchi | 358/199 |
| 4,080,634 | 3/1978 | Schreiber et al. | 358/298 |

OTHER PUBLICATIONS

IEEE: *Proceedings of* 1979 *National Aerospace and Electronics Conference*, Dayton, Ohio, USA, May 15–17, 1979, pp. 185–190, Peterson, Robert K., "Performance Improvements in Laser Beam Recorders".

*Primary Examiner*—Howard W. Britton
*Attorney, Agent, or Firm*—Lester H. Birnbaum

[57] ABSTRACT

Disclosed is a high resolution optical scanning method and apparatus. Light from a source, such as a laser, is focused onto a flat, rotating mirror. The reflected light is made incident upon a stationary elliptical mirror such that the real or virtual source is at one focus of the ellipse and the points on the line to be scanned are at the other focus along the lateral dimension of the mirror. A large useful angle of rotation is thereby achieved for each line scan.

14 Claims, 4 Drawing Figures

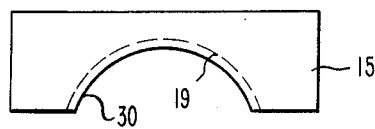
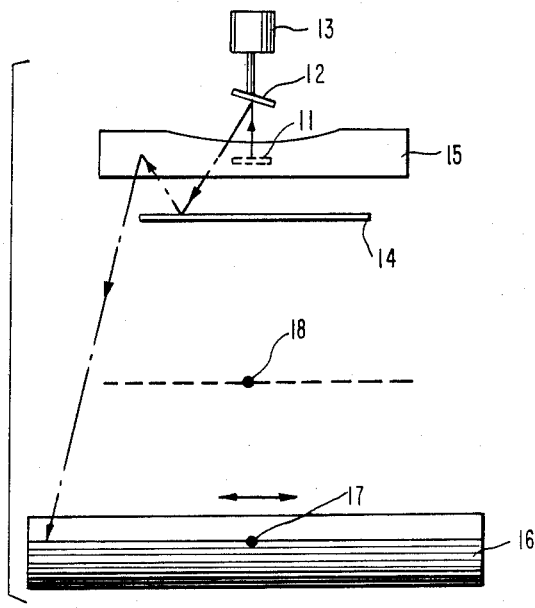
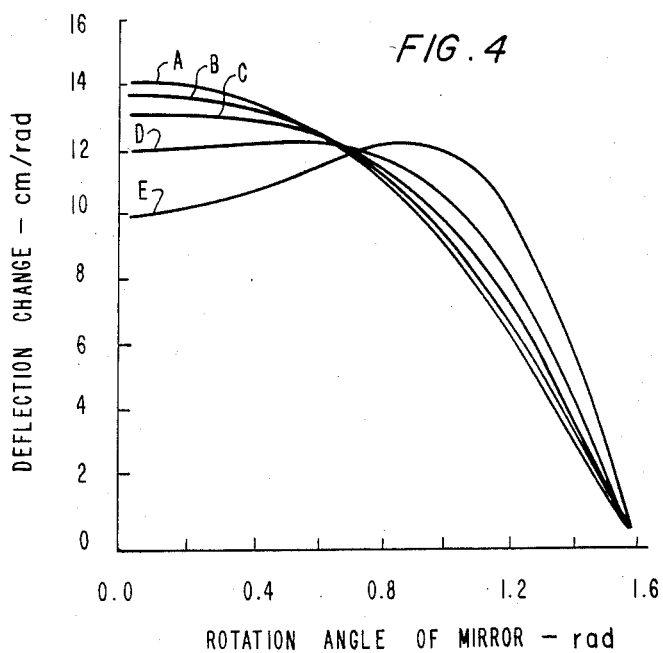

OPTICAL SCANNING METHOD AND APPARATUS

BACKGROUND OF THE INVENTION

This invention relates to providing optical scanning and in particular to a method and apparatus which is capable of high resolution line scanning in reading or writing of information.

Optical scanning apparatus are useful for a variety of functions, such as optical printing, document scanning and facsimile reproduction. A continuing need exists in these areas for improvement in resolution. For example, computer printouts are usually provided by impact printers which produce a relatively low resolution. A high quality printout can be produced by photographic techniques, which involve development of a film exposed by CRT projection, but at a fairly high cost.

Laser printers have the potential for providing high resolution at a low cost. Such apparatus utilize a laser beam to scan a rotating drum a line at a time. The drum includes a layer of material on which an electrostatic charge pattern can be formed a line at a time by the scanning action of the laser beam. This charge pattern can then be converted to a visible image on paper or other suitable material. In a typical laser printer, the scanning of the beam is effected by a rotating, multifaceted mirror. (See, e.g., U.S. Pat. No. 3,835,249 issued to Dattilo et al.) While adequate, the resolution of such systems is limited by vibrations and other effects from the motor controlling the rotating mirror. These effects are heightened by the fact that a multifaceted mirror has a limited useful angle of rotation for each line scanned. If the resolution of laser printers could be increased, they could provide a printout with the quality of photographic techniques at a fraction of the cost.

It is therefore a primary object of the invention to provide an optical scanning method and apparatus with increased resolution capabilities.

SUMMARY OF THE INVENTION

This and other objects of the invention are achieved in accordance with the invention which, in one aspect, is an optical scanning apparatus. The apparatus includes a rotatably mounted first mirror having a flat reflecting surface and mounted so as to deflect light incident thereon in an essentially circular path as the mirror is rotated. The apparatus further includes a stationary second mirror having an elliptical reflecting surface in at least two dimensions. This mirror is positioned such that the point of reflection of light from the rotating mirror is effectively at one focus of the elliptical surface and the stationary mirror is adapted to reflect light in a line through the other focus of the elliptical surface as the first mirror is rotated.

In accordance with another aspect, the invention is a method of optically scanning an object. A light beam is directed toward a rotatably mounted first mirror with a flat reflecting surface at an angle to the beam. The mirror is rotated to reflect the beam in an essentially circular path and the reflected light is directed to a second mirror having an elliptical reflecting surface in at least two dimensions. The second mirror is positioned so that the point of reflection from the rotating mirror is at one focus of the elliptical surface. A line on the surface of the scanned object is positioned at the other focus of the elliptical surface along the third dimension of the second mirror.

BRIEF DESCRIPTION OF THE DRAWING

These and other features of the invention will be delineated in detail in the following description. In the drawing:

FIG. 2 is a front view of a portion of the apparatus of FIG. 1;

FIG. 3 is a top view of a portion of the apparatus of FIG. 1; and

FIG. 4 is a graph of the sweep velocity of a scanning beam as a function of the rotation of a mirror in accordance with the same apparatus.

Figure 1:
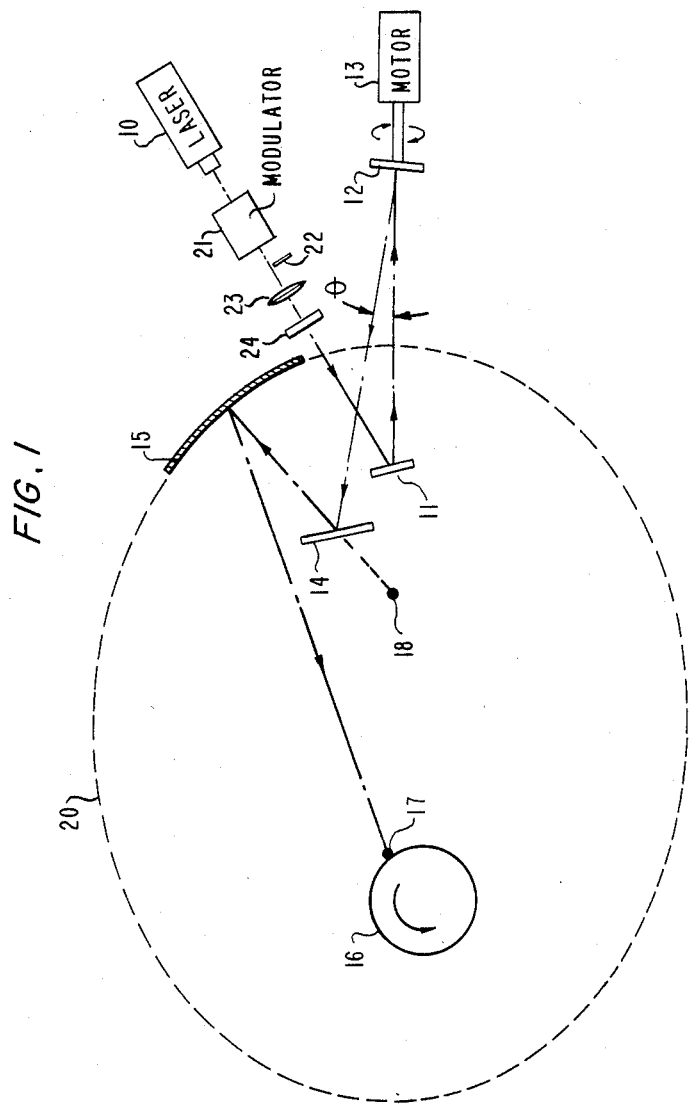
FIG. 1 is a side schematic view of apparatus in accordance with one embodiment of the invention.

It will be appreciated that for purposes of illustration, these Figures are not necessarily drawn to scale.

DETAILED DESCRIPTION

The basic principles of the invention will be described with reference to the apparatus illustrated schematically in various views in FIGS. 1-3. The apparatus is a laser scanner which is capable of scanning an object or document a line at a time. In this particular example, it is desired to write information a line at a time onto a rotating drum, 16, which includes a charged surface, by locally altering the charge pattern. The charge pattern can then be converted to a visual image on a page by application of an appropriate toner and contact with the paper (not shown) in accordance with standard techniques. (See, e.g., U.S. Pat. No. 3,898,627 issued to Hooker et al.)

The light beam utilized for scanning is provided by laser, 10, which could be, for example, a He-Ne gas laser or a gallium aluminum arsenide semiconductor laser which serves essentially as a point source of a collimated beam of light. The dashed lines and arrows in FIG. 1 indicate the approximate direction of the light beam at one point in the scanning operation.

A modulator, 21, which can be a standard piezoelectric crystal controlled by a varying voltage signal, is inserted in the light path. A knife edge, 22, is further provided so that deflection of the laser beam by the modulator results in blanking of the light source at the desired writing portions. Focus optics are provided by cylindrical lenses, 23 and 24, which are oriented at right angles so that the light beam is focused to a short line at 18 and a point at 17 illustrated in FIGS. 1 and 3. The laser beam is reflected by a stationary flat mirror, 11, onto a rotatably mounted flat mirror, 12. The latter mirror is oriented at a fixed angle to the incident beam, typically 20-25 degrees and is rotated by some means such as a motor, 13. Thus, as the mirror, 12, is rotated, the light reflected therefrom will trace out a cone in space and a circle (or portion thereof) on stationary flat mirror, 14. The beam is reflected by mirror, 14, onto stationary mirror, 15, which, in the plane depicted in FIG. 1, has an elliptical surface. That is, the mirror surface defines a portion of an ellipse in the two dimensions of the plane illustrated. The full ellipse is indicated by the dashed line, 20.

The mirror, 15, will have such elliptical shape in each plane parallel to the plane shown in FIG. 1. Thus, in three dimensions, the mirror forms a portion of an elliptical cylinder with its axis perpendicular to the plane of FIG. 1. FIG. 2 shows a view of mirror, 15, which is orthogonal to that of FIG. 1. The dashed line, 19, indicates the approximate path of the light beam reflected by mirror, 15, over the course of a complete line scan. It should be appreciated that FIG. 1 shows a cross-sectional view of mirror, 15, approximately at its center. As shown in FIG. 2, the optical path of the beam from mirror, 12, is actually through a cut-out portion, 30, of the full mirror, 15, (from the back of the mirror, 15, as shown in FIG. 2). This cut-out portion maximizes the path, 19, in this embodiment by permitting an extension of the mirror height. However, such a cut-out portion is purely optional.

Returning to FIG. 1, it will be appreciated that the mirrors are positioned so that the point of reflection of the light from mirror, 12, is effectively at one focus of the elliptical surface of mirror, 15. In this case, because of the action of mirror, 14, the virtual source of the light from mirror, 12, is at the focus, 18. If desired, the mirror, 12, could be placed physically at the focus. The mirrors are also positioned with respect to drum, 16, so that the line on the surface to be scanned passes through the other focus, 17, of the elliptical surface. As illustrated in the top view of FIG. 3, the line to be scanned is also parallel to the cylindrical axis of mirror, 15. Thus, as mirror, 12, is rotated, the light beam will scan the line on the drum coincident with the foci of the elliptical surfaces defined in each plane of the mirror, 15. Preferably, the drum rotates continuously during the scan of a document but at a sufficiently slow rate to permit each line to be scanned by one sweep of the line scanner. A typical sweep velocity is approximately 500 scans/sec while a typical drum rotation is completed in approximately 2 sec. Of course, faster speeds are possible.

In converting a circular two-dimensional motion into a linear motion, it can be shown that the deflection, w, from the center of the line is given by:

$$w = d \tan(\theta \sin(\alpha)) \quad (1)$$

where d is the total path length of the light from mirror, 12, to drum, 16, when the light is at the center of the scan line, $\theta$ is the angle between the incident and reflected light at mirror, 12, and $\alpha$ is the rotation angle of the mirror, 12. The sweep velocity is therefore given by:

$$\frac{dw}{d\alpha} = \frac{d\,\theta \cos(\alpha)}{\cos^2(\theta \sin(\alpha))} \quad (2)$$

Equation 2 is plotted for various values of d in FIG. 4. Curves A, B, C, D, and E represent values for d of 30, 25, 20, 15 and 10 cm, respectively. The angle, $\theta$, between the incident and reflected beams at mirror, 12, has also been varied to keep the sweep length fixed for each case. In order to achieve a uniform exposure, it is desirable to obtain as linear a sweep velocity as possible (e.g., curve D), although all values shown would be useful. In general, it is desirable that the sweep velocity vary no more than ten percent over the length of the scan line for a mirror rotation of 120 degrees or less. It is important to note that a very large useful angle of rotation for the mirror is attained with this scheme. For example, good linearity over a single sweep can be obtained with 120 degrees of mirror rotation (from Curve D). By using approximately one-third of motor rotation per line scan, the effects of irregularities in mechanical motion on optical resolution are minimized. In general, the rotation of the mirror for each line scan should be at least 60 degrees to insure this increased resolution.

Preferably, mirror, 12, is rotated a full 360 degrees for each line scan. A portion of this rotation will not be useful for line scanning because the reflected light will not be incident on mirror, 15, or because the sweep velocity will not be linear as illustrated in FIG. 4. The modulator, 21, and knife edge, 22, can therefore be utilized to blank the beam during these portions of the rotation of mirror, 12.

Various modifications of the invention will become apparent to those skilled in the art. All such variations which basically rely on the teachings through which the invention has advanced the art are properly considered within the spirit and scope of the invention.

What is claimed is:

1. An optical scanning apparatus comprising:
    a rotatably mounted first mirror having a flat reflecting surface and mounted so as to deflect light incident thereon in an essentially circular path as the mirror is rotated; and
    a stationary second mirror having an elliptical reflecting surface in at least two dimensions and positioned such that the point of reflection of light from the rotating mirror is effectively at one focus of the elliptical surface and the stationary mirror is adapted to reflect light in a line through the other focus of the ellipse as the first mirror is rotated.

2. The apparatus according to claim 1 wherein the stationary second mirror forms a portion of an elliptical cylinder adapted to reflect light in a line parallel to its axis.

3. The apparatus according to claim 1 further comprising a laser light source.

4. The apparatus according to claim 1 wherein the rotating mirror provides a complete line scan with a rotation of at least 60 degrees.

5. The apparatus according to claim 1 wherein the rotating mirror is positioned at a distance from the said one focus of the elliptical surface and a stationary third mirror is provided to reflect light from the rotating mirror so that the virtual source of light from the rotating mirror is at the said focus.

6. The apparatus according to claim 1 further comprising an object to be scanned comprising a rotatably mounted drum with a portion of its surface located at said other focus of the elliptical surface of the second mirror.

7. The apparatus according to claim 1 wherein the sweep velocity of the light beam varies no more than 10 percent over the length of the line scanned for a first mirror rotation no greater than 120 degrees.

8. An optical scanning apparatus comprising:
    a laser light source;
    a rotatably mounted first mirror having a flat reflecting surface at an angle with respect to light incident from said source so as to deflect the light in an essentially circular path as the mirror is rotated;
    a stationary second mirror for reflecting the light from the first mirror;
    a stationary third mirror in the shape of a portion of an elliptical cylinder for receiving the light from the second mirror and positioned so that the virtual source of light from the rotating mirror is at one focus of the elliptical surface of the third mirror; and
    an object to be scanned comprising a rotatably mounted drum with a portion of the surface coinciding with the other foci of the elliptical surface in a line parallel to the axis of the cylinder.

9. A method of optically scanning an object comprising the steps of:
  directing a light beam toward a rotatably mounted first mirror with a flat reflecting surface at an angle to the beam;
  rotating the mirror so as to reflect the beam in an essentially circular path;
  directing the reflected light to a second mirror having an elliptical reflecting surface in at least two dimensions and positioned so that the point of reflection from the rotating mirror is effectively at one focus of the elliptical surface; and
  positioning a line on the surface of the scanned object at the other focus of the elliptical surface along the third dimension of the second mirror.

10. The method according to claim 9 wherein the second mirror is in the form of a portion of an elliptical cylinder and the line on the surface is made coincident with the foci of the elliptical surface parallel to the axis of the cylinder.

11. The method according to claim 9 wherein the scanned object is a drum which is rotatably mounted so that successive lines on the surface can be positioned at the focus of the elliptical surface.

12. The method according to claim 9 wherein a line is scanned by rotating the first mirror by at least 60 degrees.

13. The method according to claim 9 wherein the beam from the first mirror is directed to a third mirror which reflects the beam to the second mirror so that the virtual source of the light from the first mirror is at the said focus of the elliptical surface.

14. The method according to claim 9 wherein the sweep velocity of the light beam varies no more than ten percent along the line scanned for a mirror rotation no greater than 120 degrees.

* * * * *